United States Patent
Olladapu et al.

(10) Patent No.: US 11,968,230 B2
(45) Date of Patent: Apr. 23, 2024

(54) MANAGING COMMUNICATION PRIVACY IN ENCROACHING ENVIRONMENTS

(71) Applicant: International Business Machines Corporation, Armonk, NY (US)

(72) Inventors: Naresh Olladapu, Jagityal (IN); Mudit Mehrotra, Bengaluru (IN); Ajay Gupta, Bengaluru (IN); Arvind Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 17/205,009

(22) Filed: Mar. 18, 2021

(65) Prior Publication Data

US 2022/0303312 A1 Sep. 22, 2022

(51) Int. Cl.
| | |
|---|---|
| H04L 29/06 | (2006.01) |
| G10L 15/00 | (2013.01) |
| G10L 15/08 | (2006.01) |
| H04L 9/40 | (2022.01) |
| H04W 12/02 | (2009.01) |
| H04M 3/493 | (2006.01) |

(52) U.S. Cl.
CPC .............. H04L 63/18 (2013.01); G10L 15/00 (2013.01); G10L 15/08 (2013.01); H04M 3/493 (2013.01); H04W 12/02 (2013.01)

(58) Field of Classification Search
CPC ....... H04L 63/18; H04W 12/02; H04M 3/493; H04M 2203/6009; H04M 2203/609; H04M 7/0057; H04M 3/2281; G10L 15/00; G10L 15/08
See application file for complete search history.

(56) References Cited

U.S. PATENT DOCUMENTS

| 9,093,069 B2 | 7/2015 | Lee et al. |
| 9,461,970 B2 | 10/2016 | Biswas et al. |

(Continued)

FOREIGN PATENT DOCUMENTS

| CN | 108023873 A | * 5/2018 | ............ H04L 63/06 |
| EP | 1266457 A1 | 12/2002 | |

(Continued)

OTHER PUBLICATIONS

"Architecting a Privacy-Preserving Dialogue System Software Development Kit"—Gerrit Klasen, Comprise, Mar. 31, 2020 https://aihub.org/2020/03/31/architecting-a-privacy-preserving-dialogue-system-software-development-kit/ (Year: 2020).*

(Continued)

*Primary Examiner* — Randy A Scott
(74) *Attorney, Agent, or Firm* — Rachel M. Yadlosky

(57) ABSTRACT

A method, system, and computer program product for managing communication privacy in a conversation system are provided. The method detects an utterance on a public channel by a user of a computing device. A privacy nature of the utterance is determined. Based on the privacy nature, a classification confidence is determined for the utterance. The method generates a privacy question to be presented to the user based on the privacy nature and the classification confidence. In response to a confirmation response, a privacy channel is established. The method switches from the public channel to the privacy channel.

20 Claims, 6 Drawing Sheets

(56) References Cited

U.S. PATENT DOCUMENTS

| | | | |
|---|---|---|---|
| 9,883,023 B2 * | 1/2018 | Schuster | H04M 1/605 |
| 10,320,781 B2 | 6/2019 | Naqvi | |
| 10,685,127 B2 | 6/2020 | Kundu et al. | |
| 2013/0191762 A1 * | 7/2013 | Rajagopalan | G06Q 10/10 |
| | | | 715/753 |
| 2014/0278409 A1 | 9/2014 | Hakkani-Tur et al. | |
| 2019/0082304 A1 * | 3/2019 | Bestor | G06F 16/90332 |

FOREIGN PATENT DOCUMENTS

| | | | | |
|---|---|---|---|---|
| JP | 2013009131 A | * | 1/2013 | |
| WO | WO-2015131709 A1 | * | 9/2015 | H04L 12/1822 |
| WO | WO-2019055213 A1 | * | 3/2019 | G06F 16/90332 |

OTHER PUBLICATIONS

"Add Integration to Private Channels on Slack"—Andy Logan, Discourse, Jun. 2020 https://meta.discourse.org/t/add-integration-to-private-channels-on-slack/155057 (Year: 2020).*

Zchelly, "Architecting a privacy-preserving dialogue system SDK", Comprise, Blog, Oct. 15, 2019, 6 pages.

Mell et al., "The NIST Definition of Cloud Computing", Recommendations of the National Institute of Standards and Technology, Special Publication 800-145, Sep. 2011, 7 pages.

* cited by examiner

MANAGING COMMUNICATION PRIVACY IN ENCROACHING ENVIRONMENTS

BACKGROUND

Conversation systems are often used in customer support contexts and automated interaction functions. Conversation systems may collect information from a user to perform or enable a host of actions. Some users engage with conversation systems in public places. Some users engage with conversation systems using voice or other publicly discernable communication styles.

SUMMARY

According to an embodiment described herein, a computer-implemented method for managing communication privacy in a conversation system is provided. The method detects an utterance on a public channel by a user of a computing device. A privacy nature of the utterance is determined. Based on the privacy nature, a classification confidence is determined for the utterance. The method generates a privacy question to be presented to the user based on the privacy nature and the classification confidence. In response to a confirmation response, a privacy channel is established. The method switches from the public channel to the privacy channel.

According to an embodiment described herein, a system for managing communication privacy in a conversation system is provided. The system includes one or more processors and a computer-readable storage medium, coupled to the one or more processors, storing program instructions that, when executed by the one or more processors, cause the one or more processors to perform operations. The operations detect an utterance on a public channel by a user of a computing device. A privacy nature of the utterance is determined. Based on the privacy nature, a classification confidence is determined for the utterance. The operations generate a privacy question to be presented to the user based on the privacy nature and the classification confidence. In response to a confirmation response, a privacy channel is established. The operations switch from the public channel to the privacy channel.

According to an embodiment described herein, a computer program product for managing communication privacy in a conversation system is provided. The computer program product includes a computer-readable storage medium having program instructions embodied therewith, the program instructions being executable by one or more processors to cause the one or more processors to detect an utterance on a public channel by a user of a computing device. A privacy nature of the utterance is determined. Based on the privacy nature, a classification confidence is determined for the utterance. The computer program product generates a privacy question to be presented to the user based on the privacy nature and the classification confidence. In response to a confirmation response, a privacy channel is established. The computer program product switches from the public channel to the privacy channel.

DETAILED DESCRIPTION

Figure 1:
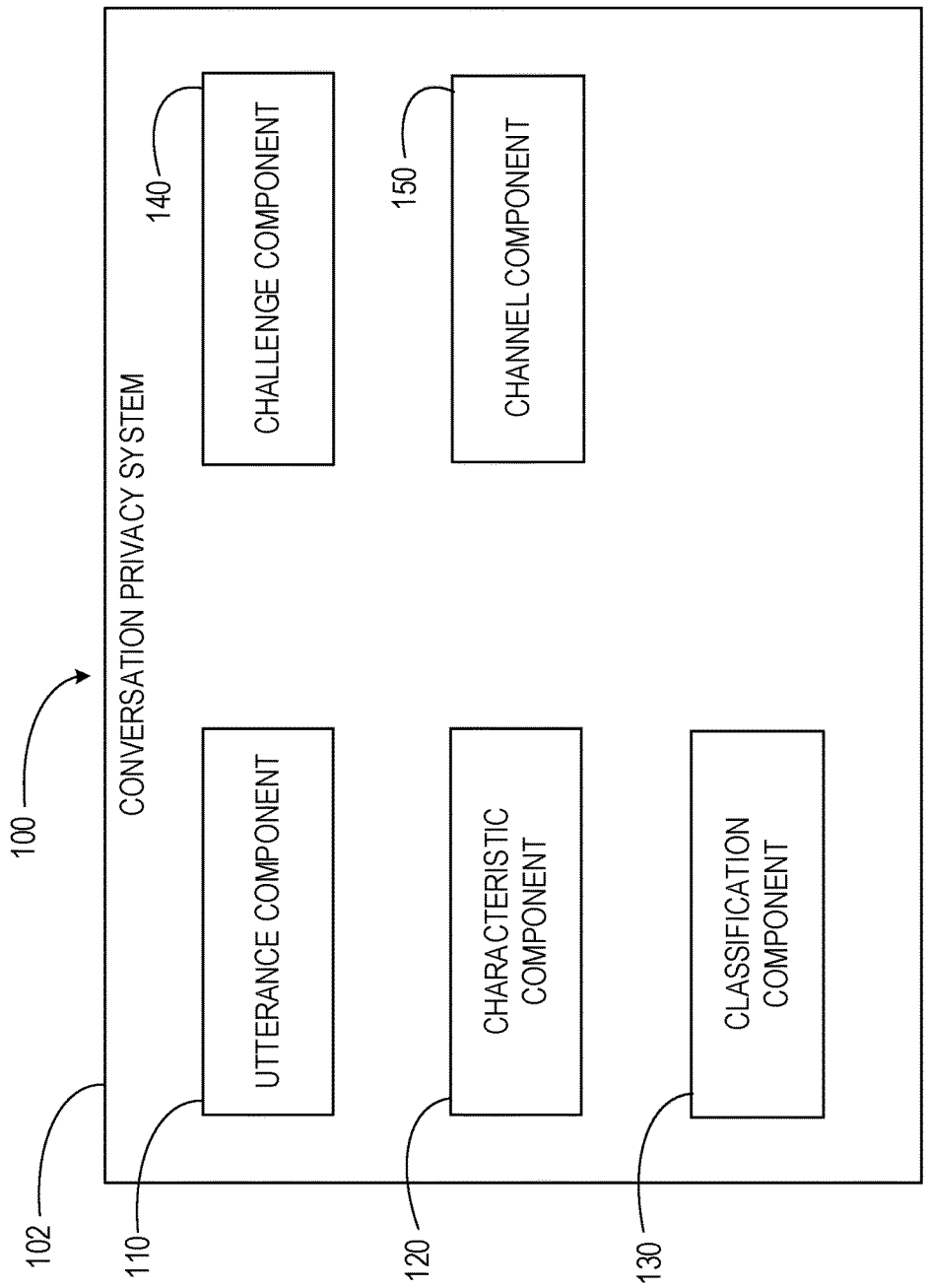
FIG. 1 depicts a block diagram of a computing environment for implementing concepts and computer-based methods, according to at least one embodiment.

The present disclosure relates generally to methods for managing communication privacy. More particularly, but not exclusively, embodiments of the present disclosure relate to a computer-implemented method for interactive conversation systems capable of intelligently managing communication privacy. The present disclosure relates further to a related system for managing communication privacy, and a computer program product for operating such a system.

Conversation systems provide information collection, customer support, and information handling capabilities. Conversation systems may provide automated or semi-automated question and response interactions to dynamically collect information for specified purposes. Examples of such systems are banking (e.g., account information lookup), hospital, and appointment systems. Conversation systems often use conventional communication channels, such as telephone, text, voice chat, or video chat. Users may engage with conversation systems using public channels such as these in any environment that suits the users. Often conversation systems are used in an open environment over open channels, such as voice calls. Although these systems provide information collection and interaction functionality, these systems are often susceptible to privacy violations. When users engage with conversation systems in open environments, these users increase risk of information theft and misuse. Information theft may be planned or unplanned. For example, eavesdropping may be planned or unplanned information theft. For example, when an adversarial party intending theft discovers that a next piece of conversation is going to be private, the adversarial party may quickly take advantage of that knowledge. While a user may accept sharing some information over open channels in an open environment, some portions of conversations are better served by a higher level of privacy or confidentiality.

Embodiments of the present disclosure enable automated management of privacy in communicating with conversation systems. In some embodiments, the present disclosure identifies sensitive or private portions of information exchanges with a conversation system. The sensitive or private portions of information exchange are transferred to a private communications channel. The present disclosure enables dynamic switching between public and private communication channels based on a private or sensitive nature of a temporary part of an interaction or information exchange with a conversation system. In some embodiments, the present disclosure provides challenge questions based on low confidence utterances which may involve sensitive or private information, the low confidence utterances may be associated with a confidence score below a specified threshold where the threshold indicates a sensitive or private nature of the utterance. The challenge questions may be dynamically generated to prevent an indication of a switch from a public to private communications channel.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a conversation privacy system 102. The communication privacy system 102 may comprise an utterance component 110, a characteristic component 120, a classification component 130, a challenge component 140, and a channel component 150. The utterance component 110 detects and interprets utterances by a user of a computing device. The characteristic component 120 determines privacy characteristics of the utterances to determine a privacy nature of each utterance. The classification component 130 determines classification confidence values for utterances. The challenge component 140 generates a privacy question to be presented to the user. The channel component 150 establishes privacy channels and switches between private and public communication channels. Although described with distinct components, it should be understood that, in at least some embodiments, components may be combined or divided, and/or additional components may be added without departing from the scope of the present disclosure.

Figure 2:
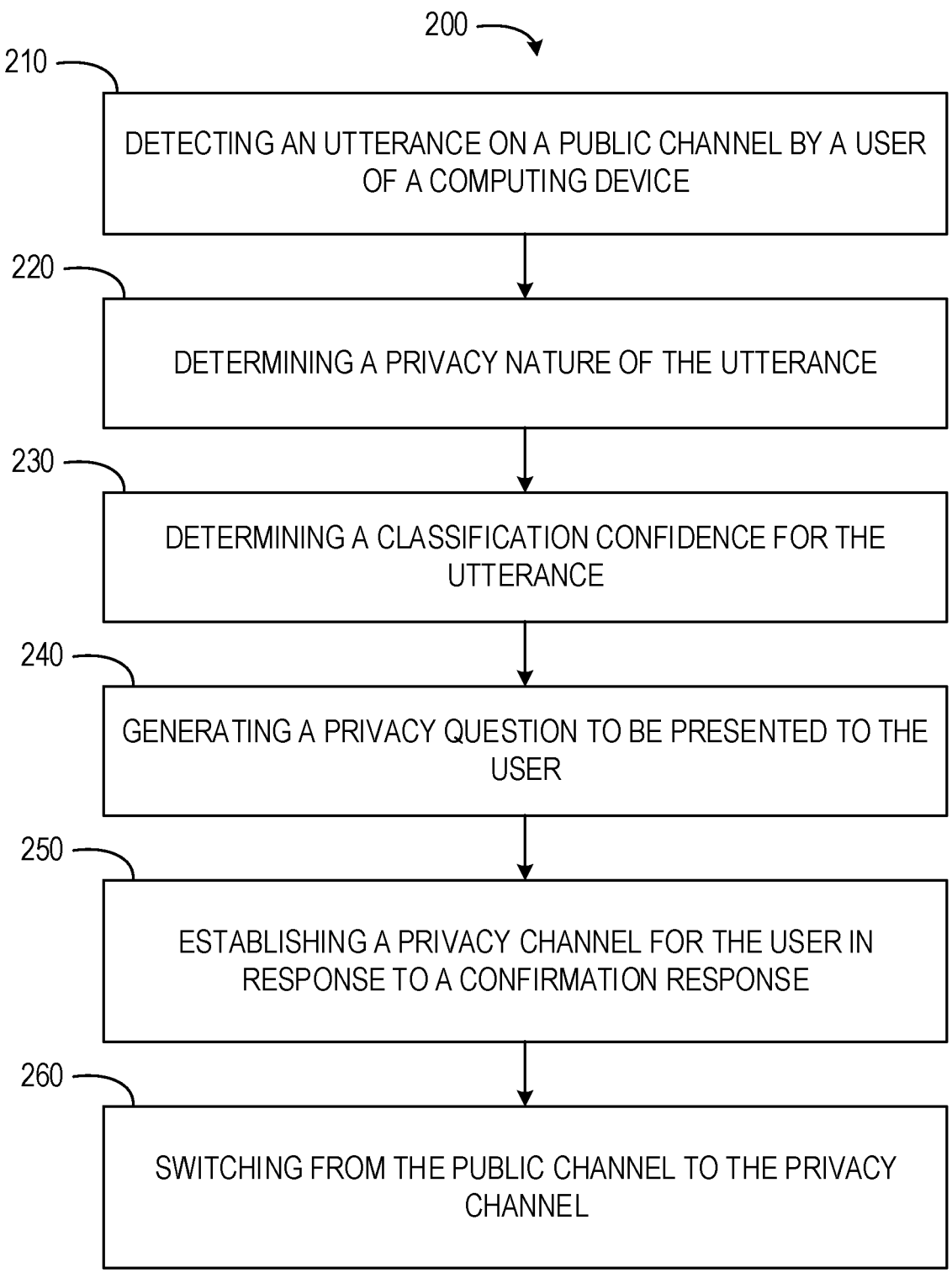
FIG. 2 depicts a flow diagram of a computer-implemented method for managing communication privacy in a conversation system, according to at least one embodiment.

Referring now to FIG. 2, a flow diagram of a computer-implemented method 200 is shown. The computer-implemented method 200 is a method for managing communication privacy in a conversation system. In some embodiments, the computer-implemented method 200 may be performed by one or more components of the computing environment 100, as described in more detail below.

At operation 210, the utterance component 110 detects an utterance on a public channel. The utterance component 110 may detect the utterance by a user of a computing device. In some embodiments, the utterance is detected using natural language processing performed on a verbal utterance or textual utterance of the user on the public channel. The utterance component 110 may detect the utterance via a user interface, a microphone, or any other suitable input device or capability.

At operation 220, the characteristic component 120 determines a privacy nature of the utterance. For example, the characteristic component 120 may determine a privacy nature is high when the utterance asks for an account balance. The characteristic component 120 may use an artificial intelligence (AI) based model to classify the privacy nature of the utterance. The AI-based model may be a machine learning model. The machine learning model may use supervised learning, clustering, dimensionality reduction, structured prediction, neural networking, reinforcement learning, or any other suitable machine learning methods. In some instances, the AI or machine learning-based model may be trained to include a privacy classifier.

In some embodiments, the characteristic component 120 determines the privacy nature of the utterance by determining a user context for the user of the computing device. In some instances, the user context considers a user profile to determine a part of a context of the utterance. The user profile may include demographic information provided by the user. In some instances, the user context considers past behavior of the user associated with the utterance. The user context may also consider social media history, previous conversations monitored by the conversation privacy system 102, or any other information, history, or interactions for which the user has provided the conversation privacy system 102 with access.

The characteristic component 120 may then determine a conversation context of the utterance. The conversation context may evaluate the utterance in relation to previous utterances within the conversation. In some instances, the utterance may be an utterance of the user or an utterance of a conversation bot. In such instances, the conversation context may be determined based on a flow of a conversation. For example, the flow of a conversation may naturally give way to a question about a graduation date or school, or a favorite sports team. The natural flow of a conversation in this example may indicate the utterance is not intended to be private. However, a conversation flow with a conversation bot, conversation system, or a customer service representative including a similar utterance (e.g., following a discussion referencing an account) may indicate an utterance is to be considered private. The conversation context may also be determined based on an application in use by the computing device, a call placed by the user, words said or entered by the user prior to the utterance, or any other suitable information. For example, the characteristic component 120 may determine the conversation context based on the user interacting with the conversation privacy system 102 through a banking application or calling a telephone number for bank or insurance agent. Similarly, the characteristic component 120 may use natural language processing to determine the conversation context based on words used by the user indicating they are engaged in a conversation which may involve personal, sensitive, or privacy information.

The characteristic component 120 may then determine an environment of the computing device. The environment may be determined based on user or device location, ambient noise or conversation, a user interface selection of the user, a network connection available to the computing device (e.g., available Bluetooth or Wi-Fi signals), or any other suitable location context. In some embodiments, the characteristic component 120 determines whether the environment is public or private. The public/private determination may be based on user or device location, ambient noise, available network connections, and other suitable information. For example, the characteristic component 120 may use detailed location information, sanitized location information, or generalized location information to determine the environment of the user, device, or conversation without using unauthorized location information. Similarly, the characteristic component 120 may use ambient noise or conversation by detecting ambient volume levels proximate to the computing device to estimate a public or private environment for the computing device. The characteristic component 120 may also determine whether other individuals are proximate to the user or computing device. Such determinations may be made based on identified sounds or other suitable sensors.

At operation 230, the classification component 130 determines a classification confidence for the utterance. In some embodiments, the classification confidence is determined based on the privacy nature of the utterance. The classification component 130 may determine the classification confidence where the AI or machine learning model of the characteristic component 120 does not conclusively determine the privacy nature of the utterance. In some instances, the classification component 130 receives a privacy nature indicator for the utterance. The privacy nature indicator may include a value or a set of values generated by the characteristic component 120. The value or set of values may be a numerical representation of the privacy nature of the utterance or a set of values including numerical representations of differing elements associated with the utterance including user profile, conversation context, and communication environment. The classification component 130 may determine the privacy nature indicator falls below a privacy threshold for the utterance. In some instances, the classification component 130 compares the privacy nature indicator with the privacy threshold to determine that the utterance falls below the privacy threshold but within a verification range for an utterance. The verification range for an utterance may indicate that evidence for the private nature exists for the utterance, but the evidence is insufficient to clearly indicate the privacy nature of the utterance.

In some instances, the verification range for the utterance may indicate that the nature of the utterance, or information to be presented after the utterance, has a lower sensitivity or privacy level than would otherwise trigger a privacy response for the utterance. For example, the utterance may fall within the verification range where the utterance indicates information will be exchanged which is not private of itself, but may be used to determine private information.

At operation 240, the challenge component 140 generates a privacy question to be presented to the user. In some embodiments, the privacy question is generated at least in part based on the privacy nature of the utterance. The privacy question may be generated at least in part on the classification confidence. In some embodiments, the privacy question is generated based on the privacy nature of the utterance and the classification confidence. The privacy question may be generated to confirm the privacy nature of the utterance where the utterance falls within the verification range of the privacy threshold. In some instances, the privacy question is to be presented in an open environment and is generated in consideration of the environment of the computing device.

In some embodiments, the challenge component 140 generates the privacy question by generating a first privacy question based on the privacy nature of the utterance and the classification confidence of the utterance. The first privacy question may be generated without regard to an environment of the computing device. In some instances, the challenge component 140 determines whether to generate a second privacy question based on a public nature or potential for intrusion on the conversation of the user. The challenge component 140 may then generate a second privacy question based on the user context, the conversation context of the utterance, and the environment of the computing device. The second privacy question may be generated with a higher level of semantic mask related to the privacy nature of the utterance. For example, where the first privacy question is generated as "What is the account balance?" the second privacy question may be generated as "I would like to know finance information."

In some embodiments, the challenge component 140 generates the privacy question by determining an utterance domain for the utterance. The challenge component 140 may then generate the privacy question based on the utterance domain. In such embodiments, the privacy question may be generated based on a domain ontology of the utterance. The domain ontology may be understood as a vocabulary associated with the utterance domain. For example, in a conversation system built for finance, the challenge component 140 may generate an utterance using finance ontology to generate a privacy preserving response.

At operation 250, the channel component 150 establishes a privacy channel. The privacy channel may be established for the user. In some embodiments, the privacy channel is established in response to a confirmation response. The privacy channel may be established on the computing device of the user or on another computing device associated with or accessible to the user.

In some embodiments, the channel component 150 establishes the privacy channel by identifying a privacy channel preference for the user. The privacy channel preference may include a phone call, a text, a specified application, or any other specified preferred communication channel. The channel component 150 may establish the privacy channel based on the privacy channel preference of the user. Where the privacy channel preference of the user is determined to be absent (e.g., no privacy preference is set) or unavailable (e.g., the preferred privacy channel is not able to be used), the channel component 150 may establish the privacy channel based on available privacy channel options. For example, the channel component 150 may establish the privacy channel based on a proximity of available privacy channel options, like an alternative computing device.

In some instances, an optimal channel switching determination is made based on advance utterance prediction. The optimal channel switching determination may be performed to ensure switching from a public channel to a private channel is performed such that private communications occur on the private channel. The optimal channel switching determination manages communication such that as few non-private communications or utterances occur on the private channel as possible. Further, the optimal channel switching determination is performed to reduce channel switching to those instances or utterances which are suitably private. The channel component 150 cooperates with other components of the conversation privacy system 102 to generate an utterance generation model. The utterance generation model is applied to generate a future utterance given a dialogue context thus far. The utterance may be classified into private or non-private using a trained classifier such as the classification component 130. A reinforcement learning method may be applied for planning channel switching. A cost may be associated with communicating over an inappropriate channel (e.g., private utterances over a public channel). Another cost may be associated with channel switching. A reward may be applied to models or components of the conversation privacy system 102 for channel switching at an appropriate time to divert communications to a properly suitable communications channel.

At operation 260, the channel component 150 switches from the public channel to the privacy channel. The channel component 150 may switch communication of the conversation system between the public channel and the privacy channel for a period of time. For example, the channel component 150 may switch to the privacy channel for the duration of a communication session. In some instances, the channel component 150 switches to the privacy channel for a duration of privacy related utterances. In such instances, the channel component 150 may revert back to the public channel once the utterances of the user are no longer considered private.

Figure 3:
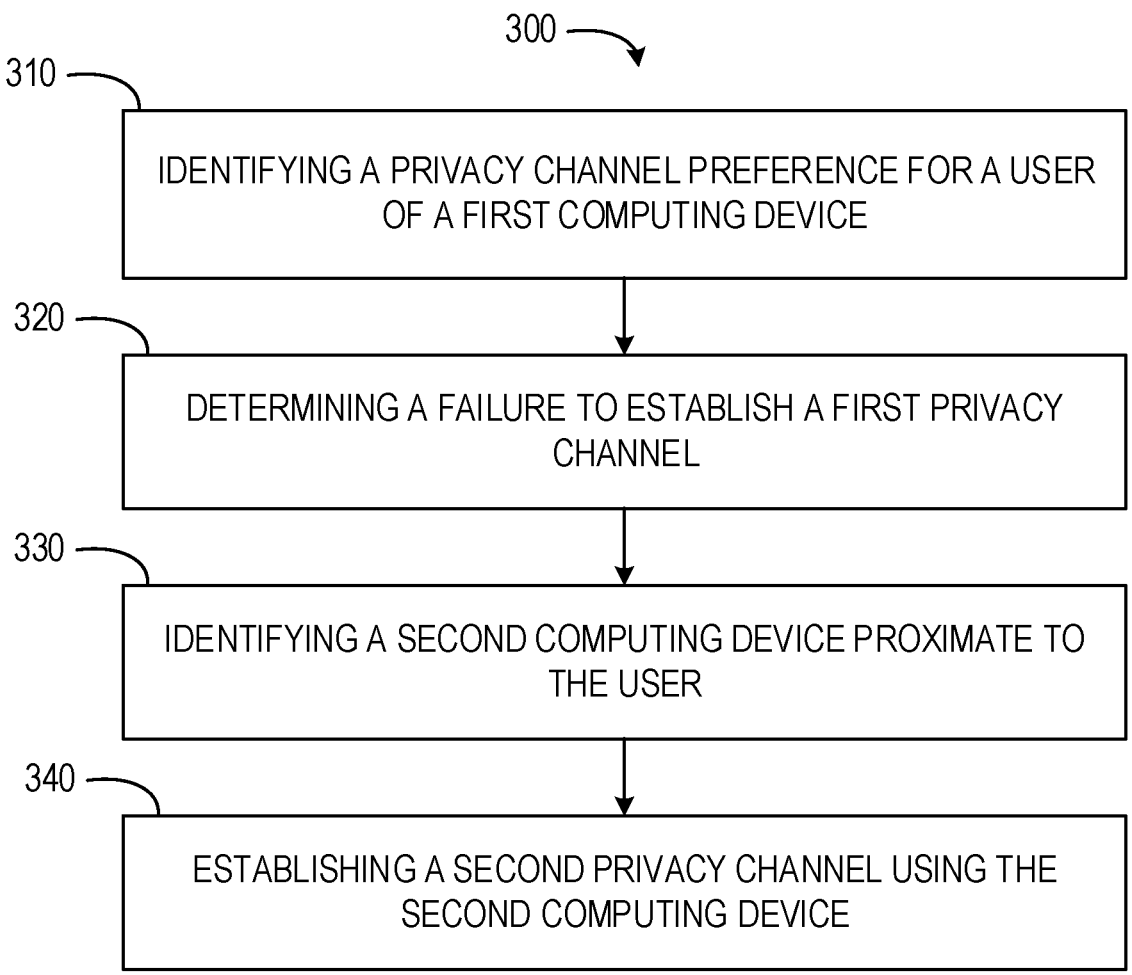
FIG. 3 depicts a flow diagram of a computer-implemented method for managing communication privacy in a conversation system, according to at least one embodiment.

FIG. 3 shows a flow diagram of an embodiment of a computer-implemented method 300 for managing communication privacy in a conversation system. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the channel component 150 identifies a privacy channel preference. The privacy channel preference may be a preference for the user of a first computing device. The privacy channel preference may be a preference set by a user manually, a preference set by a user using an opt in selection, a preference set by a user using an opt out selection, a group of preferences set by a user, a ranked choice or ranked group set by a user, or any other suitable preference. The privacy channel preference may include a specified computing device, a specified communication type, or a specified privacy mechanism. The specified computing device may be a second computing device, distinct from the computing device a user is currently using to communicate with a conversation system. The specified communication type may be any suitable communication type such as text, email, voice, voice over internet protocol (VOIP), voice conference, video conference, or any other suitable communication type. The privacy mechanism may include encryption or any other suitable privacy mechanism.

In operation 320, the channel component 150 determines a failure to establish a first privacy channel. The first privacy channel may be selected based on the privacy channel preference of the user. In some instances, the channel component 150 attempts to establish the first privacy channel based on a first privacy channel preference of the user. For example, where the user has established a ranked preference for privacy channels, the channel component 150 may determine a failure to establish the first privacy channel as a highest ranked preference of the user. The channel component 150 may determine the failure to establish the first privacy channel based on an absent device, a lack of network connection, a failure to establish communication via a specified application, or any other suitable determination of failure.

In operation 330, the channel component 150 identifies a second computing device. In some embodiments, the second computing device is proximate to the user. The second computing device may be associated with a second privacy channel. In some embodiments, the second computing device is associated with a privacy preference of the user at a rank lower than the privacy channel preference associated with the failed first privacy channel. In some instances, the second computing device is a computing device associated with the user. The second computing device may be designated as an alternate communication device.

In some embodiments, the channel component 150 identifies the second computing device which is associated with a privacy channel (e.g., the second privacy channel). The second computing device, associated with the privacy channel, may be proximate to the user. The second privacy channel may be distinct from the first privacy channel.

In operation 340, the channel component 150 establishes the second privacy channel using the second computing device. In some embodiments, the second privacy channel may be established in a manner similar to or the same as described above with respect to operation 250. The channel component 150 may then switch the communication channel from a current, public channel to the second privacy channel.

Figure 4:
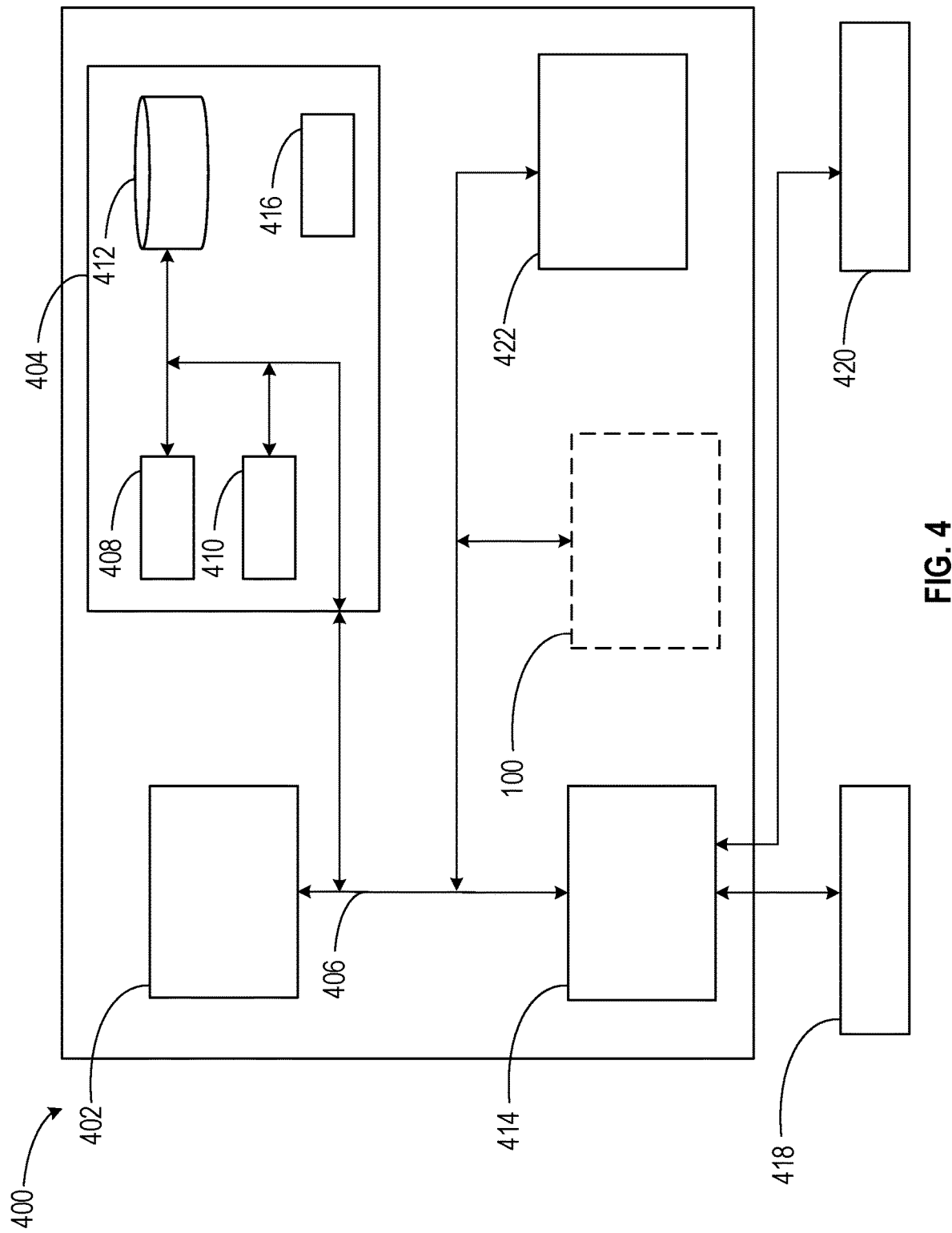
FIG. 4 depicts a block diagram of a computing system for managing communication privacy in a conversation system, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for managing communication privacy in a conversation system.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the utterance component 110, the characteristic component 120, the classification component 130, the challenge component 140, and the channel component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
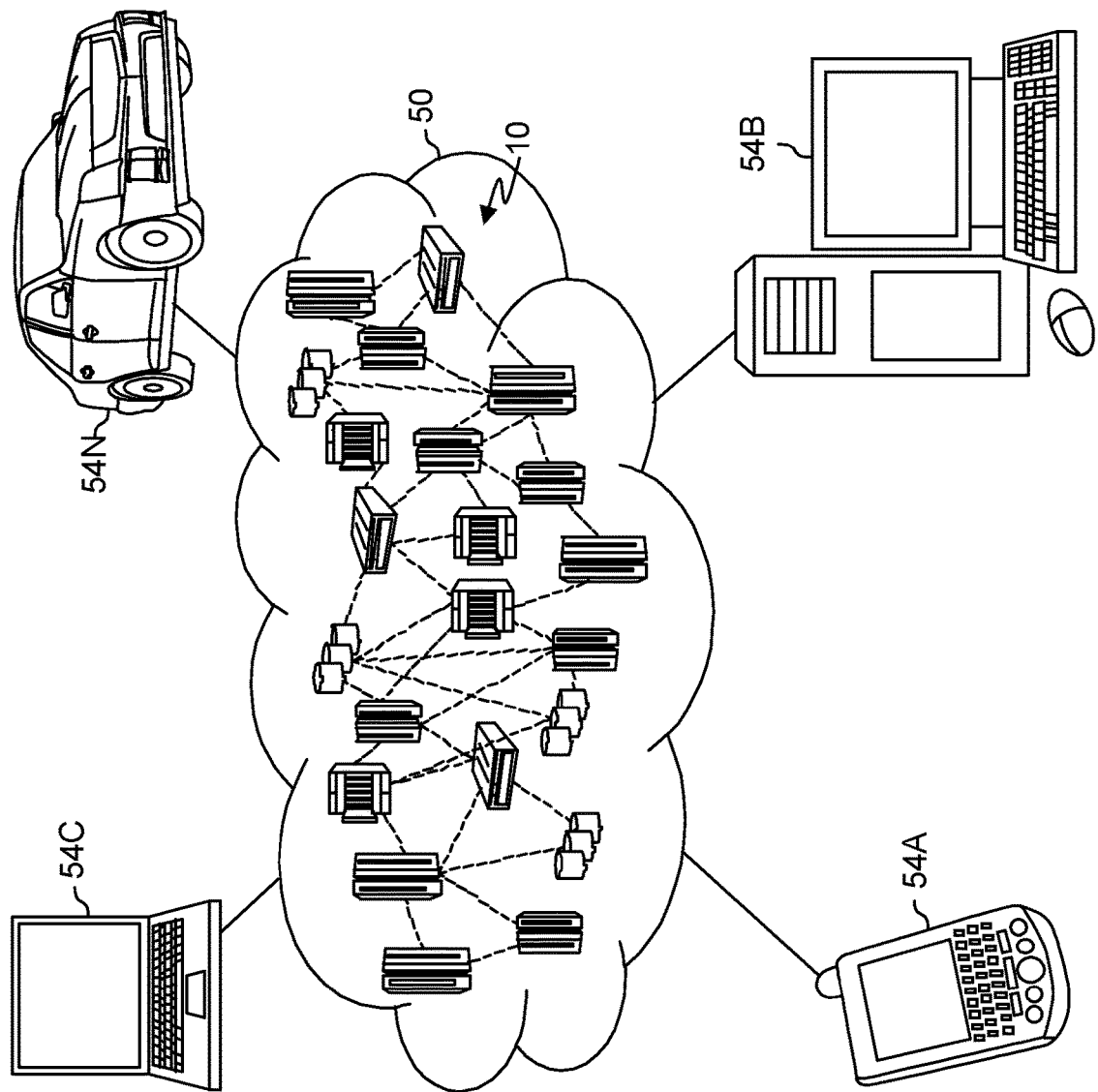
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
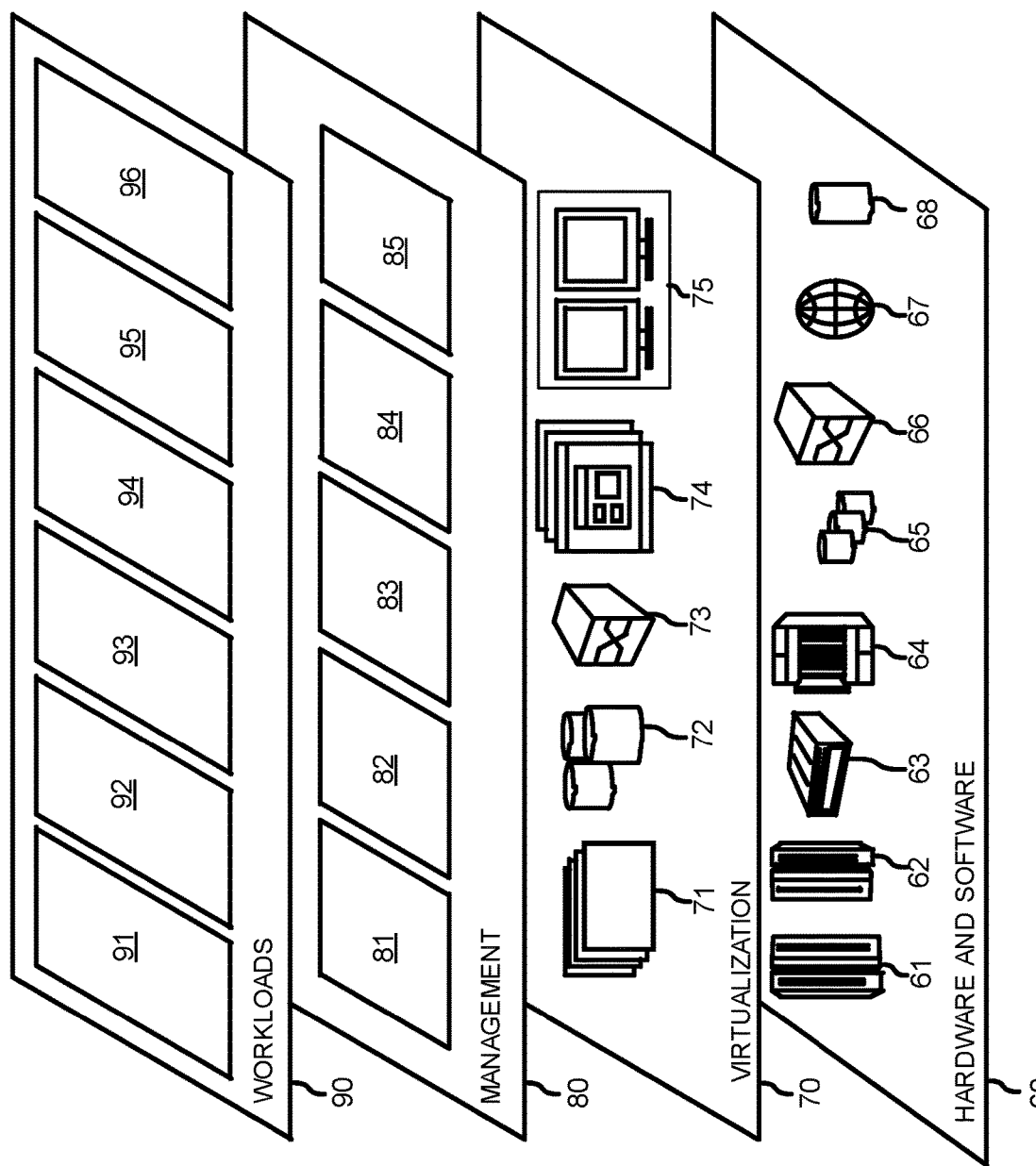
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and privacy processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting an utterance on a public channel by a user of a computing device;
   determining a privacy nature of the utterance on the public channel using user context for the user, contents of the utterance, conversation context of the utterance, and environment of the computing device;
   using the privacy nature, determining a classification confidence for the utterance;
   using the privacy nature and the classification confidence, generating a privacy question presented to the user;
   in response to a confirmation response to the privacy question, establishing a privacy channel; and
   switching from the public channel to the privacy channel.

2. The method of claim 1, wherein generating the privacy question further comprises:
   generating a first privacy question based on the privacy nature of the utterance and the classification confidence of the utterance; and
   generating a second privacy question based on the user context, the conversation context of the utterance, and the environment of the computing device.

3. The method of claim 1 further comprising:
   determining an utterance domain for the utterance; and
   generating the privacy question based on the utterance domain.

4. The method of claim 1, wherein establishing the privacy channel further comprises:
   identifying a privacy channel preference for the user; and
   establishing the privacy channel based on the privacy channel preference of the user.

5. The method of claim 1, wherein the computing device is a first computing device, and wherein establishing the privacy channel further comprises:
   identifying a privacy channel preference for the user;
   determining a failure to establish a first privacy channel based on the privacy channel preference of the user;
   identifying a second computing device, proximate to the user, the second computing device associated with a second privacy channel; and
   establishing the second privacy channel using the second computing device.

6. The method of claim 1, wherein the computing device is a first computing device and wherein establishing the privacy channel further comprises:
   identifying a second computing device, proximate to the user, the second computing device associated with a privacy channel; and
   establishing the privacy channel using the second computing device.

7. The method of claim 1, wherein the confirmation response confirms that one or more utterances are intended to be private.

8. A system, comprising:
   one or more processors; and
   a computer-readable storage medium, coupled to the one or more processors, storing program instructions that, when executed by the one or more processors, cause the one or more processors to perform operations comprising:
      detecting an utterance on a public channel by a user of a computing device;
      determining a privacy nature of the utterance on the public channel using user context for the user and contents of the utterance;
      using the privacy nature, determining a classification confidence for the utterance;
      using the privacy nature and the classification confidence, generating a privacy question presented to the user;
      in response to a confirmation response to the privacy question, establishing a privacy channel; and
      switching from the public channel to the privacy channel.

9. The system of claim 8, wherein generating the privacy question further comprises:
   generating a first privacy question based on the privacy nature of the utterance and the classification confidence of the utterance; and
   generating a second privacy question based on the user context, a conversation context of the utterance, and an environment of the computing device.

10. The system of claim 8, wherein the operations further comprise:
    determining an utterance domain for the utterance; and
    generating the privacy question based on the utterance domain.

11. The system of claim 8, wherein establishing the privacy channel further comprises:
    identifying a privacy channel preference for the user; and
    establishing the privacy channel based on the privacy channel preference of the user.

12. The system of claim 8, wherein the computing device is a first computing device, and wherein establishing the privacy channel further comprises:
    identifying a privacy channel preference for the user;
    determining a failure to establish a first privacy channel based on the privacy channel preference of the user;
    identifying a second computing device, proximate to the user, the second computing device associated with a second privacy channel; and
    establishing the second privacy channel using the second computing device.

13. The system of claim 8, wherein the computing device is a first computing device and wherein establishing the privacy channel further comprises:
    identifying a second computing device, proximate to the user, the second computing device associated with a privacy channel; and
    establishing the privacy channel using the second computing device.

14. The system of claim 8, wherein the switching from the public channel to the privacy channel is for a duration of future utterances.

15. A computer program product comprising a computer readable storage medium having program instructions embodied therewith, the program instructions being executable by one or more processors to cause the one or more processors to perform operations comprising:

detecting an utterance on a public channel by a user of a computing device;

determining a privacy nature of the utterance on the public channel;

using the privacy nature, determining a classification confidence for the utterance;

using the privacy nature and the classification confidence, generating a privacy question presented to the user;

in response to a confirmation response to the privacy question, establishing a privacy channel, wherein the confirmation response confirms that one or more utterances are intended to be private; and switching from the public channel to the privacy channel, wherein the switching is for a duration of future utterances.

16. The computer program product of claim 15, wherein determining the privacy nature of the utterance uses user context for the user, contents of the utterance, conversation context of the utterance, and environment of the computing device.

17. The computer program product of claim 15, wherein the operations further comprise:

determining an utterance domain for the utterance; and generating the privacy question based on the utterance domain.

18. The computer program product of claim 15, wherein establishing the privacy channel further comprises:

identifying a privacy channel preference for the user; and establishing the privacy channel based on the privacy channel preference of the user.

19. The computer program product of claim 15, wherein the computing device is a first computing device, and wherein establishing the privacy channel further comprises:

identifying a privacy channel preference for the user;

determining a failure to establish a first privacy channel based on the privacy channel preference of the user;

identifying a second computing device, proximate to the user, the second computing device associated with a second privacy channel; and establishing the second privacy channel using the second computing device.

20. The computer program product of claim 16, wherein the operations further comprise:

generating a first privacy question based on the privacy nature of the utterance and the classification confidence of the utterance; and generating a second privacy question based on the user context, the conversation context of the utterance, and the environment of the computing device, and presenting the second privacy question to the user.

\* \* \* \* \*